US010463107B2

(12) United States Patent
Greene

(10) Patent No.: US 10,463,107 B2
(45) Date of Patent: *Nov. 5, 2019

(54) ARTICLE OF FOOTWEAR INCLUDING A BLADDER ELEMENT HAVING A CUSHIONING COMPONENT WITH A SINGLE CENTRAL OPENING AND METHOD OF MANUFACTURING

(71) Applicant: NIKE, Inc., Beaverton, OR (US)

(72) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,261

(22) Filed: Aug. 24, 2017

(65) Prior Publication Data

US 2017/0347749 A1 Dec. 7, 2017

Related U.S. Application Data

(62) Division of application No. 14/931,280, filed on Nov. 3, 2015, now Pat. No. 9,775,407.

(51) Int. Cl.
| *A43B 13/20* | (2006.01) |
| *B29D 35/12* | (2010.01) |
| *A43B 13/26* | (2006.01) |
| *A43B 13/12* | (2006.01) |
| *B29D 35/14* | (2010.01) |

(52) U.S. Cl.
CPC .......... *A43B 13/206* (2013.01); *A43B 13/122* (2013.01); *A43B 13/26* (2013.01); *B29D 35/122* (2013.01); *B29D 35/142* (2013.01)

(58) Field of Classification Search
CPC ...... A43B 13/20; A43B 13/203; A43B 13/206

USPC ............................................. 36/29, 153, 35 B
See application file for complete search history.

(56) References Cited

U.S. PATENT DOCUMENTS

| 1,498,838 A | 6/1924 | Harrison, Jr. |
| 1,771,793 A | 7/1930 | Kind |
| D164,456 S | 9/1951 | Sprigg |
| D164,457 S | 9/1951 | Sprigg |

(Continued)

FOREIGN PATENT DOCUMENTS

| EP | 0714613 A2 | 6/1996 |
| WO | 9809546 A1 | 3/1998 |
| WO | 0119211 A1 | 3/2001 |

OTHER PUBLICATIONS

Solereview.com Product Review, "Nike Air Max 2014 Review", May 28, 2014, 18 pps., http://www.solereview.com/nike-air-max-2014-review/, printed Mar. 23, 2015.

*Primary Examiner* — Ted Kavanaugh

(74) *Attorney, Agent, or Firm* — Quinn IP Law

(57) ABSTRACT

An article of footwear is disclosed that includes a sole structure having a fluid-filled bladder element. The bladder element includes multiple fluid-filled cushioning components each having a single central opening extending completely therethrough and a continuous fluid-filled cavity surrounding the central opening. The cushioning components are spaced apart from one another so that an outer surface of each of the cushioning components is substantially decoupled from an outer surface of an adjacent one of the cushioning components. A method of manufacturing a sole structure of an article of footwear comprises forming such a bladder element.

20 Claims, 7 Drawing Sheets

(56) References Cited

U.S. PATENT DOCUMENTS

| | | | |
|---|---|---|---|
| 4,123,855 A * | 11/1978 | Thedford | A43B 1/0045 36/153 |
| 4,523,393 A | 6/1985 | Inohara | |
| 4,934,071 A | 6/1990 | Virgini | |
| 5,195,257 A * | 3/1993 | Holcomb | A43B 13/203 36/28 |
| D376,897 S | 12/1996 | Passke et al. | |
| D376,898 S | 12/1996 | Passke et al. | |
| D376,899 S | 12/1996 | Passke et al. | |
| D377,110 S | 1/1997 | Passke et al. | |
| D377,111 S | 1/1997 | Passke et al. | |
| D377,112 S | 1/1997 | Passke et al. | |
| D377,113 S | 1/1997 | Passke et al. | |
| D377,559 S | 1/1997 | Passke et al. | |
| 5,598,645 A | 2/1997 | Kaiser | |
| D378,629 S | 4/1997 | Passke et al. | |
| D385,394 S | 10/1997 | Passke et al. | |
| D386,289 S | 11/1997 | Passke et al. | |
| D386,290 S | 11/1997 | Passke et al. | |
| D386,894 S | 12/1997 | Passke et al. | |
| D411,912 S * | 7/1999 | Van Noy | D2/946 |
| 6,463,612 B1 | 10/2002 | Potter | |
| 7,244,483 B2 | 7/2007 | Tawney et al. | |
| 7,448,150 B1 * | 11/2008 | Davis | A43B 13/203 36/153 |
| 7,451,555 B1 | 11/2008 | Lakic | |
| 8,850,718 B2 | 10/2014 | Lubart | |
| 8,961,844 B2 | 2/2015 | Baghdadi et al. | |
| 2002/0035794 A1 | 3/2002 | Doyle | |
| 2002/0050077 A1 | 5/2002 | Wang et al. | |
| 2007/0074423 A1 | 4/2007 | Goodwin et al. | |
| 2007/0107266 A1 | 5/2007 | Sun | |
| 2012/0174432 A1 | 7/2012 | Peyton | |
| 2012/0233885 A1 | 9/2012 | Shaffer et al. | |
| 2012/0255198 A1 | 10/2012 | Langvin et al. | |
| 2013/0167401 A1 * | 7/2013 | Christensen | A43B 13/184 36/29 |
| 2013/0212909 A1 * | 8/2013 | Bates | A43B 13/189 36/102 |
| 2013/0227858 A1 | 9/2013 | James | |
| 2014/0020264 A1 | 1/2014 | Holt | |
| 2014/0230276 A1 * | 8/2014 | Campos, II | B29D 35/122 36/84 |
| 2014/0283413 A1 * | 9/2014 | Christensen | A43B 3/0057 36/102 |
| 2015/0272271 A1 * | 10/2015 | Campos, II | B29D 35/122 36/29 |

* cited by examiner

# ARTICLE OF FOOTWEAR INCLUDING A BLADDER ELEMENT HAVING A CUSHIONING COMPONENT WITH A SINGLE CENTRAL OPENING AND METHOD OF MANUFACTURING

CROSS-REFERENCE TO RELATED APPLICATION

This application is a divisional application of and claims the benefit of priority to U.S. application Ser. No. 14/931,280, filed Nov. 3, 2015, which is hereby incorporated by reference in its entirety.

TECHNICAL FIELD

The present teachings generally include an article of footwear with a sole structure having a bladder element, and a method of manufacturing a sole structure of an article of footwear.

BACKGROUND

Footwear typically includes a sole configured to be located under a wearer's foot to space the foot away from the ground or floor surface. Athletic footwear in particular sometimes utilizes polyurethane foam or other resilient materials in the sole to provide cushioning. Fluid-filled bladders are sometimes included in the sole to provide desired impact force absorption, motion control, and resiliency.

DESCRIPTION

Figure 1:
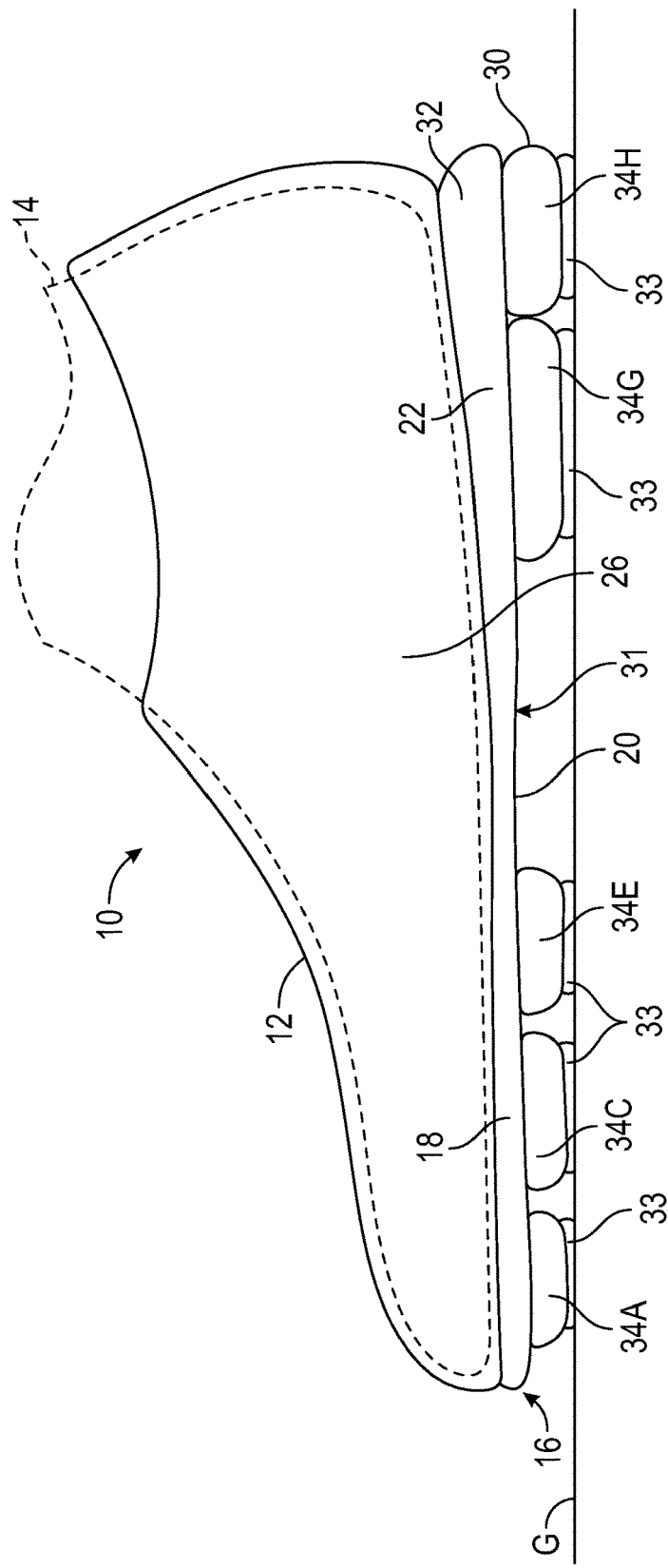
FIG. 1 is a schematic illustration in side view of an article of footwear having a sole structure and showing a bladder element with hidden lines.

An article of footwear is disclosed that includes a sole structure having a fluid-filled bladder element. The bladder element includes multiple fluid-filled cushioning components each having a single central opening extending completely therethrough and a continuous fluid-filled cavity surrounding the central opening. In an embodiment, one or more of the cushioning components is a regular ring torus or an irregular ring torus.

The cushioning components are spaced apart from one another so that an outer surface of each of the cushioning components is substantially decoupled from an outer surface of an adjacent one of the cushioning components.

In an embodiment, the cushioning components include a first cushioning component and a second cushioning component both positioned in a forefoot portion of the sole structure. The first cushioning component is positioned between a medial extremity of the sole structure and the second cushioning component, and the second cushioning component is positioned between a lateral extremity of the sole structure and the first cushioning component. In such an embodiment, the cushioning components may further include a third cushioning component and a fourth cushioning component. The third cushioning component is positioned between the medial extremity of the sole structure and the fourth cushioning component, and the fourth cushioning component is positioned between the lateral extremity of the sole structure and the third cushioning component. The third and fourth cushioning components are rearward of the first and second cushioning components.

In an embodiment, the cushioning components include a first cushioning component that extends across a longitudinal midline of the sole structure in a heel portion of the sole structure, and a second cushioning component that extends across the longitudinal midline of the sole structure and is spaced rearward of the first cushioning component in the heel portion of the sole structure.

In an embodiment, at least one of the cushioning components extends laterally from a lateral extremity of the sole structure over a longitudinal midline of the article of footwear.

The bladder element may further include a pair of tubular cushioning components extending lengthwise in a longitudinal direction in a midfoot portion of the article of footwear. Both of the tubular cushioning components are connected to one of the cushioning components forward of the pair of tubular cushioning components and to another one of the cushioning components rearward of the pair of tubular cushioning components.

The bladder element may include channels connecting adjacent ones of the cushioning components and establishing fluid communication between the adjacent ones of the cushioning components. In an embodiment, a first of the channels is in a forefoot portion of the sole structure, and a second of the channels is in a heel portion of the sole structure. The first and the second of the channels are sealed so that the adjacent ones of the cushioning components connected by the sealed channels are not in fluid communication with one another.

The bladder element may include an inflation port positioned at a periphery of the bladder element and in fluid communication with the adjacent ones of the cushioning components via the channels.

The sole structure may further comprise foam surrounding at least a portion of the outer surface of one or more of the cushioning components.

The sole structure may further comprise a sole layer having a ground-facing surface. The bladder element has a first side attached to the ground-facing surface of the sole layer with the ground-facing surface of the sole layer exposed both between the cushioning components and within the central opening of each of the cushioning components. The sole layer may be a midsole layer, such as a foam midsole layer. The sole layer may have a differential stiffness. For example, the sole layer may be foam with a differential stiffness, or may include a plate having a differential stiffness.

In an embodiment, the bladder element has a second side opposite to the first side, and the second side has a ground-facing surface. The sole layer has slats extending generally transversely over the first side of the bladder element.

In an embodiment, a gap is provided between adjacent ones of the cushioning components and extends from a medial extremity to a lateral extremity of the sole structure. By configuring the sole structure with such a gap, increased fore-aft flexibility is achieved in comparison to a bladder element without the gap, as the bladder element can flex along the gap.

Substantially decoupling the cushioning components allows at least some of the outer surfaces of the cushioning components to be surrounded by or encased in foam in some embodiments. Gaps between the lengths of the tubes may be filled with the foam, or may be free from foam or other structure. The foam-filled or empty gaps allow for increased fore-aft flexibility of the sole structure in comparison to a bladder element in which outer surfaces of adjacent cushioning components are not substantially decoupled.

A method of manufacturing a sole structure of an article of footwear comprises forming a bladder element having multiple fluid-filled cushioning components, each cushioning component having a single central opening extending completely therethrough and having a continuous fluid-filled cavity surrounding the central opening. The cushioning components are spaced apart from one another so that an outer surface of each cushioning component is substantially decoupled from an outer surface of an adjacent one of the cushioning components. For example, forming the bladder element may be by blow molding or thermoforming.

Forming the bladder element may further comprise forming channels connecting adjacent ones of the cushioning components to establish fluid communication between the adjacent ones of the cushioning components, and forming an inflation port disposed at a periphery of the bladder element and in fluid communication with the adjacent ones of the cushioning components via the channels.

In an embodiment, the method may further comprise disposing the bladder element so that a gap between adjacent ones of the cushioning components extends from a lateral extremity of the sole structure to a medial extremity of the sole structure.

The method may include sequential inflation of the bladder element to achieve multiple inflation pressures in different portions of the bladder element. For example, in an embodiment, the method may further comprise inflating the bladder element through the inflation port to a first inflation pressure, and then closing one of the channels to form a sealed first portion of the bladder element, A first remaining unsealed portion of the bladder element may then be inflated through the inflation port to a second inflation pressure, and another of the channels may be closed to form a sealed second portion of the bladder element. A second remaining unsealed portion of the bladder element may then be inflated through the inflation portion to a third inflation pressure, thereby establishing different inflation pressures in different ones of the cushioning components separated from one another by the closed channels.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Referring to the drawings wherein like reference numbers refer to like components throughout the several views, FIG. 1 shows an article of footwear 10 in a medial side view. As shown, the article of footwear 10 is an athletic shoe. In other embodiments, the article of footwear 10 could be for another category of footwear, such as a dress shoe, a work shoe, a sandal, a slipper, or a boot.

The article of footwear 10 includes an upper 12 configured with a cavity that receives a foot 14 of a wearer. The upper 12 can be a variety of flexible materials such as textiles, and fabrics, and may include plastic support components. The upper 12 may be multiple pieces sewn, knitted, or bonded to one another. The upper 12 may include a lacing system or may be a slip-on sock. The upper 12 may further include support elements, such as a heel counter. The upper 12 is shown worn on the foot 14, which is shown in phantom.

Figure 2:
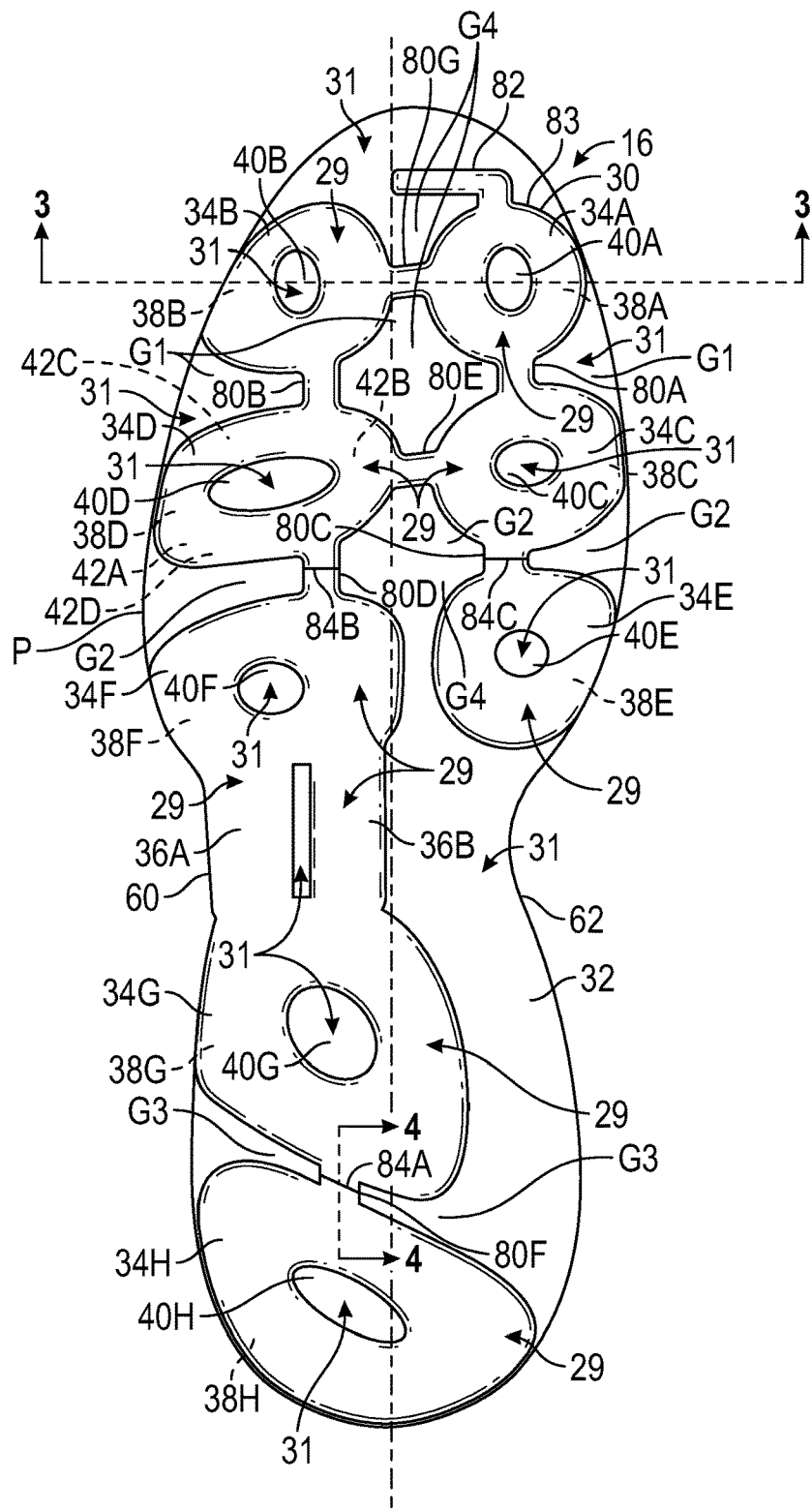
FIG. 2 is a schematic illustration in bottom view of the sole structure of FIG. 1 including the bladder element.

The article of footwear 10 includes a sole structure 16 operatively secured to the upper 12 and providing cushioning between the foot 14 and the ground G. The article of footwear 10 and the sole structure 16 have a forefoot portion 18, a midfoot portion 20, and a heel portion 22. The forefoot portion 18 generally includes portions of the sole structure 16 corresponding with the toes and the joints connecting the metatarsals with the phalanges of the foot 14. The midfoot portion 20 generally corresponds with an arch area of the foot 14, and extends from the forefoot portion 18 to a heel portion 22. The heel portion 22 generally corresponds with rear portions of a human wearer's foot 14, including the calcaneus bone, with the foot 14 corresponding in size to the article of footwear 10. The heel portion 22 is defined as approximately the rear third of the sole structure 16. The midfoot portion 20 is defined as the middle third of sole structure 16. The forefoot portion 18 is defined as the front third of the sole structure 16. As shown in FIG. 2, a perimeter P of the sole structure 16 surrounds the forefoot portion 18, the midfoot portion 20, and the heel portion 22. The article of footwear 10 is shown in a bottom view in FIG. 2, and is for a right foot. A pair of footwear includes the article of footwear 10, and an article of footwear for a left foot that is a mirror image of the article of footwear 10.

The sole structure 16 has a medial side 26 best shown in FIG. 1, and a lateral side 24 best shown in FIG. 2. The lateral side 24 includes all portions of the sole structure 16 on a side of a longitudinal midline L closest to a lateral side of the foot 14. The medial side 26 includes all portions of the sole structure 16 on a side of the longitudinal midline L closest to a medial side of the foot 14. The lateral side 24 of the sole structure 16 is a side that corresponds with the side of the foot 14 that is generally further from the other foot of the wearer (i.e., the side closer to the fifth toe of the wearer). The fifth toe is commonly referred to as the little toe. The medial side 26 of the sole structure 16 is the side that corresponds with an inside area of the foot 14 and is generally closer to the other foot of the wearer (i.e., the side closer to the hallux of the foot of the wearer). The hallux is commonly referred to as the big toe.

The sole structure 16 includes a fluid-filled bladder element 30 shown and discussed in further detail with respect to FIG. 2. In FIG. 1, the sole structure 16 also includes a sole layer 32. The sole layer 32 is a midsole layer that may be foam. The foam sole layer 32 is shown covering upper portions of the outer surface 29 of the bladder element 30, with the bladder element 30 secured to a ground-facing surface 31 of the sole layer 32.

In other embodiments, the foam sole layer 32 may cover the entire outer surface of the bladder element 30, filling openings in the bladder element and generally encasing the bladder element 30. The foam sole layer 32 may be but is not limited to ethylene vinyl acetate (EVA) foam or polyurethane foam. In addition to the foam sole layer 32, the sole structure 16 may include an outsole or discreet outsole elements 33 secured to bottom portions of the outer surface of the bladder element 30 to therefore be positioned between the bladder element 30 and the ground G as shown in FIG. 1. The outsole elements 33 are removed in FIG. 2. Similar outsole elements may be used in the bladder embodiments shown and described with respect to FIGS. 10-13. For example, the outsole or outsole elements 33 may be rubber or another relatively durable material for providing traction and grip. Outsole elements 33 may be attached to or made integral with the bladder element 30. Alternatively, the foam sole layer 32 may serve as a unitary midsole and outsole. The sole structure 16 may also include various support elements, such as one or more plates that may also be encased in the sole layer 32. Still further, no foam may be used. For example, the bladder element 30 could instead be directly attached to the upper 12, or to an insole.

The bladder element 30 is a polymeric material capable of retaining a pressurized fluid. For example, the bladder element 30 may comprise a thermoplastic polyurethane material (TPU). Optionally the TPU may be recyclable and regrindable, and may be made from recycled TPU, allowing the material of the bladder element 30 to be recycled and reused.

The bladder element 30 may be blow molded or alternatively may be thermoformed from upper and lower sheets. The sheets may have alternating layers of TPU and a gas barrier material. In any embodiment, the bladder element 30 is configured to retain fluid within the fluid-filled chambers. As used herein, a "fluid" includes a gas, including air, an inert gas such as nitrogen, or another gas. Accordingly, "fluid-filled" includes "gas-filled". The various materials used for the bladder element 30 may be substantially transparent or may have a tinted color. For example, the bladder element 30 can be formed from any of various polymeric materials that can retain a fluid at a predetermined pressure, including a fluid that is a gas, such as air, nitrogen, or another gas. For example, the bladder element 30 can be a TPU material, a urethane, polyurethane, polyester, polyester polyurethane, and/or polyether polyurethane.

Moreover, in one embodiment, the bladder element 30 can be formed of one or more sheets having layers of different materials. The sheets may be laminate membranes formed from thin films having one or more first layers that comprise thermoplastic polyurethane layers and that alternate with one or more second layers, also referred to herein as barrier layers, gas barrier polymers, or gas barrier layers. The second layers may comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The first layer may be arranged to form an outer surface of the polymeric sheet. That is, the outermost first layer may be the outer surface of the bladder element 30. The bladder element 30 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 30 may also be a flexible microlayer membrane that includes alternating layers of a gas barrier polymer material such as second layers and an elastomeric material such as first layers, as disclosed in U.S. Pat. Nos. 6,082,025 and 6,127,026 to Bonk et al. which are incorporated by reference in their entireties. With such alternating layers, for example, the bladder element 30 or any of the additional bladder elements discussed herein may have a gas transmission rate for nitrogen of less than 10 cubic centimeters per square meter per atmosphere per day, or of less than 1 cubic centimeter per square meter per atmosphere per day. Additional suitable materials for the bladder element 30 are disclosed in U.S. Pat. Nos. 4,183,156 and 4,219,945 to Rudy which are incorporated by reference in their entireties. Further suitable materials for the bladder element 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 30, engineering properties such as tensile strength, stretch properties, fatigue characteristics, dynamic modulus, and loss tangent can be considered. When the bladder element 30 is formed from sheets, the thicknesses of the sheets used to form the bladder element 30 can be selected to provide these characteristics.

The bladder element 30 includes multiple cushioning components. More specifically, the bladder element 30 includes cushioning components 34A, 34B, 34C, 34D, 34E, 34F, 34G, and 34H. Each cushioning component 34A, 34B, 34C, 34D, 34E, 34F, 34G, and 34H includes an enclosed fluid-filled cavity. More specifically, cushioning component 34A includes a fluid-filled cavity 38A. Cushioning component 34B includes a fluid-filled cavity 38B. Cushioning component 34C includes a fluid-filled cavity 38C. Cushioning component 34D includes a fluid-filled cavity 38D. Cushioning component 34E includes a fluid-filled cavity 38E. Cushioning component 34F includes a fluid-filled cavity 38F. Cushioning component 34G includes a fluid-filled cavity 38G. Cushioning component 34H includes a fluid-filled cavity 38H.

The cushioning components 34A, 34B, 34C, 34D, 34E, 34F, 34G, and 34H each have a single central opening that extends completely therethrough. As used herein, a "central opening" need not be positioned at a true center of the cushioning component. More specifically, if the cushioning component is a regular torus, the cushioning component will have a center axis and the central opening will be centered at the center axis. If the cushioning component is an irregular torus, the central opening does not have a center axis, and although it is bounded by the material of the cushioning component, the central opening is therefore not centered within the cushioning component.

Cushioning component 34A has a single central opening 40A that extends completely therethrough. The fluid-filled cavity 38A is a continuous fluid-filled cavity that completely surrounds the central opening 40A. Cushioning component 34B has a single central opening 40B that extends completely therethrough. The fluid-filled cavity 38B is a continuous fluid-filled cavity that completely surrounds the central opening 40B. Cushioning component 34C has a single central opening 40C that extends completely therethrough. The fluid-filled cavity 38C is a continuous fluid-filled cavity that completely surrounds the central opening 40C. Cushioning component 34D has a single central opening 40D that extends completely therethrough. The fluid-filled cavity 38D is a continuous fluid-filled cavity that completely surrounds the central opening 40D. Cushioning component 34E has a single central opening 40E that extends completely therethrough. The fluid-filled cavity 38E is a continuous fluid-filled cavity that completely surrounds the central opening 40E. Cushioning component 34F has a single central opening 40F that extends completely therethrough. The fluid-filled cavity 38F is a continuous fluid-filled cavity that completely surrounds the central opening 40F. Cushioning component 34G has a single central opening 40G that extends completely therethrough. The fluid-filled cavity 38G is a continuous fluid-filled cavity that completely surrounds the central opening 40G. Cushioning component 34H has a single central opening 40H that extends completely therethrough. The fluid-filled cavity 38H is a continuous fluid-filled cavity that completely surrounds the central opening 40H.

Figure 3:
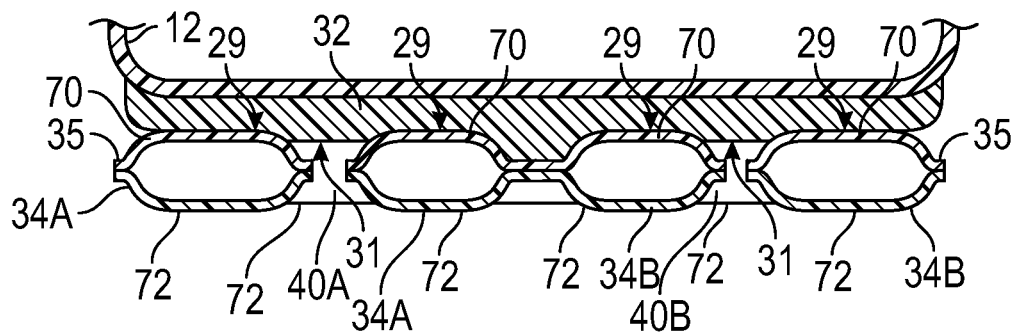
FIG. 3 is a schematic cross-sectional illustration of a first cushioning component the bladder element of FIG. 2 taken at lines 3-3 in FIG. 2.

As indicated in FIGS. 2 and 3, the ground-facing surface 31 of the sole layer 16 is exposed both between and around the cushioning components 34A, 34B, 34C, 34D, 34E, 34F, 34G, 34H and 36A, 36B, and within the central opening 40A, 40B, 40C, 40D, 40E, 40F, and 40G of each of the cushioning components 34A, 34B, 34C, 34D, 34E, 34F, 34G, and 34H, as well as between the tubular cushioning components 36A, 36B.

Each of the cushioning components 34A, 34B, 34C, 34D, 34E, 34F, 34G, and 34H is a ring torus. As shown, each of the cushioning components 34A, 34B, 34C, 34D, 34E, 34F, 34G, and 34H is an irregular ring torus. Alternatively, one or more of the cushioning components 34A, 34B, 34C, 34D, 34E, 34F, 34G, and 34H could be configured as a regular ring torus. As used herein, an "irregular ring torus" is a surface or solid formed by rotating a closed shape, such as but not limited to a circle, an oval, a square, or a rectangle, around a line that lies in the same plane as the closed shape but does not intersect the closed shape (e.g., like a ring-shaped doughnut), wherein the closed shape varies as it is rotated about the line, the distance from the line varies as the closed shape is rotated about the line, or both vary. A "regular ring torus" is a surface or solid formed by rotating a closed shape, such as but not limited to a circle, an oval, a square, or a rectangle, around a line that lies in the same plane as the closed shape but does not intersect the closed shape (e.g., like a ring-shaped doughnut), wherein neither the closed shape nor the distance from the line varies as the closed shape is rotated about the line.

Figure 5:
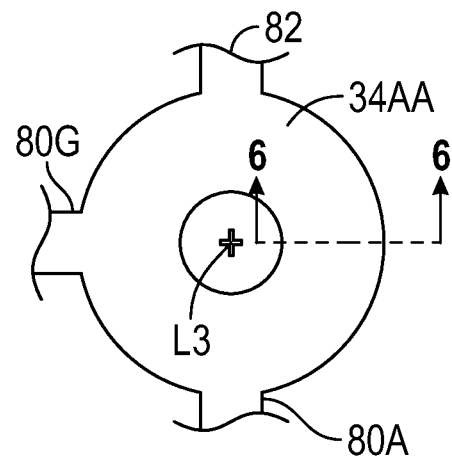
FIG. 5 is a schematic illustration in fragmentary bottom view of one of the cushioning components of FIG. 2.
Figure 6:
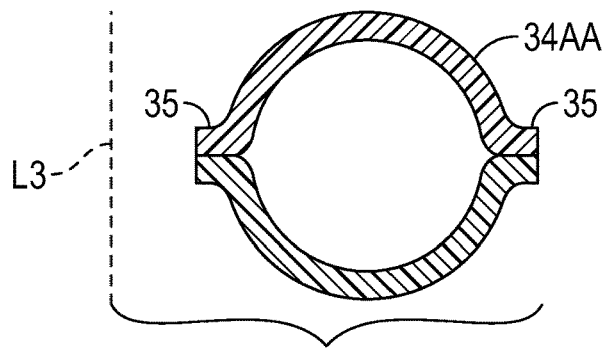
FIG. 6 is a schematic cross-sectional illustration of the cushioning component of FIG. 5 taken at lines 6-6 in FIG. 5.
Figure 9:
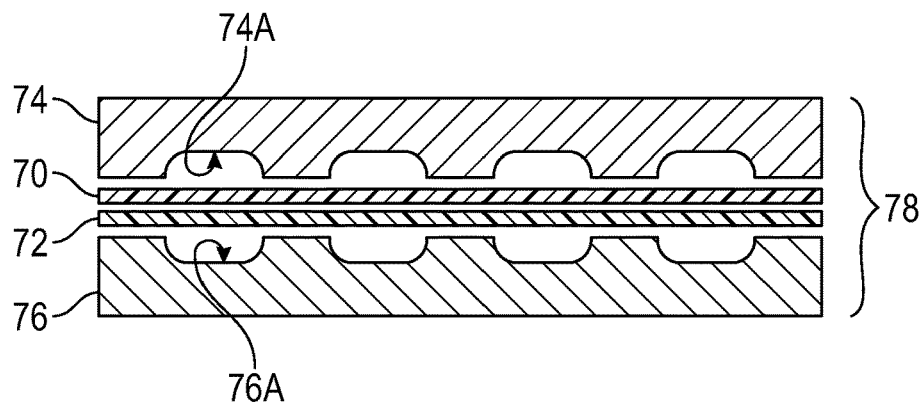
FIG. 9 is a schematic cross-sectional illustration of a mold assembly thermoforming the bladder element of FIG. 21 from polymer sheets.

FIG. 5 is an example of a cushioning component 34AA that is a regular ring torus and that could be used in place of cushioning component 34A. The cushioning component 34AA is a closed circle in cross-section that is rotated around the line L3 illustrated in FIG. 6 to form the ring torus of FIG. 5. The cushioning component 34AA is thus equidistant from the line L3 at any cross-section of the cushioning component 34AA through a plane that includes the line L3, and the line L3 is thus a center axis of the cushioning component 34AA. In FIG. 6, the cushioning component 34AA is thermoformed from upper and lower sheets as discussed herein, resulting in a peripheral flange 35. For example, the bladder element 30 could be formed from a first polymeric sheet 70 and a second polymeric sheet 72 positioned between first and second mold halves 74, 76 of a mold assembly 78 shown in FIG. 9. The sheets 70, 72 are vacuum-formed and thermoformed to mold surfaces 74A, 76A and compression formed to one another at the peripheral flange 35 indicated in FIGS. 3 and 7. FIG. 3 is taken at the lines 3-3 shown in FIG. 2, and rotated 180 degrees from the bottom view of FIG. 2.

Figure 7:
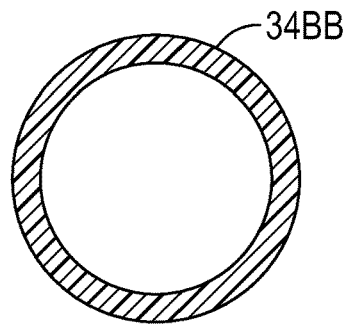
FIG. 7 is a schematic cross-sectional illustration of an alternative configuration of a cushioning component for the bladder element of FIG. 2.

FIG. 7 is an example of a cushioning component 34BB identical to cushioning component 34AA, but without a peripheral flange 35. For example, the cushioning component 34BB could be blow molded rather than thermoformed, in which case there is no resulting peripheral flange.

Figure 8:
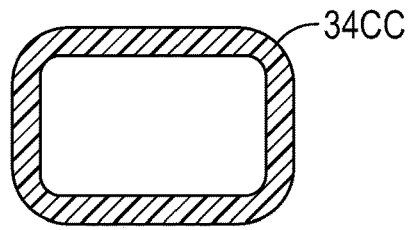
FIG. 8 is a schematic illustration of another alternative configuration of a cushioning component of the bladder element of FIG. 2.

FIG. 8 is another example of a cushioning component 34CC that can be used in place of the cushioning component 34 and the cushioning component 34AA. The cushioning component 34CC is a closed rectangle in cross-section and, like cushioning component 34A, is rotated around the line L3 and is a regular ring torus. The cushioning components 34A, 34B, 34C, 34D, 34E, 34F, 34G, and 34H are each an irregular ring torus because none of these are configured to be equidistant from a center axis such as line L3. Additionally, each is an irregular ring torus because the closed shape of the component in cross-section varies and is not uniform at all cross-sections taken in a plane that includes an axis through the central opening. For example, it is apparent in FIG. 2 that a cross-section of the cushioning component 34D would be wider at locations 42A, 42B than at locations 42C, and 42D.

By configuring each cushioning component 34A, 34B, 34C, 34D, 34E, 34F, 34G, and 34H as a regular or irregular ring torus, a relatively large cushioning area is provided while the overall height of the cushioning component is relatively small in comparison to its width. For example, if the cushioning component 34A did not have the central opening 40A, it would tend to inflate in a ball shape, causing it to be much higher at its center. Additionally, the central opening 40A allows deflection of the cushioning component 34A downward and inward toward the central opening 40A.

The bladder element 30 includes a pair of tubular cushioning components 36A, 36B that extends lengthwise in a longitudinal direction, generally at the midfoot portion 20 of the sole structure 16, with the tubular component 36A extending generally along a medial extremity 62 of the sole structure 16. In other words, the tubular cushioning components 36A, 36B extend lengthwise generally fore-aft in the sole structure 16, at less than 45 degrees with a longitudinal midline L of the sole structure 16. Both of the tubular cushioning components 36A, 36B are connected to the cushioning component 34F forward of the pair of tubular cushioning components 36A, 36B and are connected to cushioning component 34G rearward of the pair of tubular cushioning components 36A, 36B.

The cushioning component 34A is positioned between the medial extremity 62 and the cushioning component 34B. The cushioning component 34B is positioned between the lateral extremity 60 and the cushioning component 34A. The cushioning component 34C is positioned between the medial extremity 62 and the cushioning component 34D. The cushioning component 34D is positioned between the lateral extremity 60 and the cushioning component 34C. The cushioning component 34E is positioned between the medial extremity 62 and the cushioning component 34F. The cushioning component 34F is positioned between the lateral extremity 60 and the cushioning component 34E. The cushioning components both extend across the longitudinal midline L of the sole structure 16 from the lateral extremity 60.

The cushioning component 34C is rearward of the cushioning component 34A, and the cushioning component 34D is rearward of the cushioning component 34B. The cushioning component 34E is rearward of the cushioning component 34C, and the cushioning component 34F is rearward of the cushioning component 34D. The cushioning components 34A, 34B, 34C, and 34D are generally in the forefoot portion 18 of the sole structure 16. The cushioning components 34E, 34F, and the tubular cushioning components 36A, 36B are generally in the midfoot portion 20 of the sole structure 16. The cushioning components 34G and 34H are generally in the heel portion 22 of the sole structure 16, with the cushioning component 34H rearward of the cushioning component 34G. The cushioning components 34G, 34H serve as a crash pad for reacting and distributing forces during a heel strike.

In the embodiment of FIG. 2, the cushioning component 34A may be referred to as the first cushioning component, the cushioning component 34B may be referred to as the second cushioning component, the cushioning component 34C may be referred to as the third cushioning component, and the cushioning component 34D may be referred to as the fourth cushioning component. Alternatively, the cushioning component 34G may be referred to as the first cushioning component, and the cushioning component 34H may be referred to as the second cushioning component. Any of the cushioning components 34A, 34B, 34C, 34D, 34E, 34F, 34G, and 34H may simply be referred to as the cushioning component, and any of the cushioning components 34A, 34B, 34C, 34D, 34E, 34F, 34G, and 34H may be referred to as an additional cushioning component.

The cushioning components 34A, 34B, 34C, 34D, 34E, 34F, 34G, and 34H are substantially decoupled from one another. As used herein, outer surfaces of adjacent ones of the cushioning components are "substantially decoupled" from one another if they are connected with one another only by inflation channels or by the tubular cushioning components. In other words, adjacent cushioning components may be indirectly connected to one another by a channel that establishes fluid communication or by the tubular cushioning components, but the outer surfaces of adjacent ones of the cushioning components are not directly connected to one another, nor are they indirectly connected to one another by webbing formed from the material used to form the cushioning components. Adjacent cushioning components are disconnected from one another along more than fifty percent of their perimeters. Moreover, the outer surface of a cushioning component 34A, 34B, 34C, 34D, 34E, 34F, 34G, or 34H is not connected to the outer surface of an adjacent cushioning component 34A, 34B, 34C, 34D, 34E, 34F, 34G, or 34H either directly or by webbing. As discussed herein, adjacent cushioning components are connected only indirectly by channels, such as channels 80A, 80B, 80C, 80D, 80E, 80F, and 80G, or, in the case of adjacent cushioning components 34F, 34G, by the tubular cushioning components 36A, 36B. Bladder elements typically have webbing between inflated portions. Webbing is uninflated portions of polymeric material used to form a bladder element, such as sheet material. The bladder element 30 has no such webbing and, instead, gaps are provided between the lengths of each adjacent cushioning component. The arrangement of the cushioning components in the bladder element 30 provides cushioning support where needed under the foot 14, while the polymeric material is absent from other areas in order to minimize material waste and enhance flexibility as discussed herein.

The channels 80A, 80B, 80C, 80D, 80E, 80F and 80G connect adjacent ones of the cushioning components 34A, 34B, 34C, 34D, 34E, 34F, 34G, and 34H along portions of their perimeters to establish fluid communication between the connected adjacent ones of the cushioning components 34A, 34B, 34C, 34D, 34E, 34F, 34G, and 34H when the channels 80A, 80B, 80C, 80D, 80E, 80F and 80G are not sealed. In the embodiment of FIG. 2, the channel 80A connects cushioning component 34A to the cushioning component 34C. The channel 80B connects the cushioning component 34B to the cushioning component 34D. The channel 80C connects the cushioning component 34C to the cushioning component 34E. The channel 80D connects the cushioning component 34D to the cushioning component 34F. The channel 80E connects the cushioning component 34C to the cushioning component 34D. The channel 80F connects the cushioning component 34G to the cushioning component 34H. The channel 80G connects the cushioning component 34A to the cushioning component 34B. One or more of the channels 80A, 80B, 80C, 80D, 80E, 80F, and 80G can be sealed so that the adjacent cushioning components connected by the sealed channel are isolated from fluid communication with one another (i.e., are not in fluid communication with one another through the sealed channel).

The bladder element 30 includes an inflation port 82 that is disposed at a forward-most periphery 83 of the bladder element 30. Alternatively, the inflation port 82 could be provided at another location along the periphery of the bladder element 30. In the embodiment shown, the inflation port 82 is connected to the cushioning component 34A and is in fluid communication with all of the cushioning components 34A, 34B, 34C, 34D, 34E, 34F, 34G, and 34H, via the channels 80A, 80B, 80C, 80D, 80E, 80F and 80G when the channels 80A, 80B, 80C, 80D, 80E, 80F and 80G are not sealed.

The channels 80A, 80B, 80C, 80D, 80E, 80F and 80G and the inflation port 82 are formed simultaneously with the cushioning components 34A, 34B, 34C, 34D, 34E, 34F, 34G, and 34H by thermoforming or blow molding polymeric material to form the bladder element 30. Accordingly, the cushioning components 34A, 34B, 34C, 34D, 34E, 34F, 34G, and 34H, the channels 80A, 80B, 80C, 80D, 80E, 80F and 80G, and the inflation port 82 are formed simultaneously with one another and are of the same material. The inflation port 82 and the channels 80A, 80B, 80C, 80D, 80E, 80F and 80G are positioned and configured to enable the bladder element 30 to be inflated with and to retain different fluid pressures in different portions of the bladder element 30.

Figure 4:
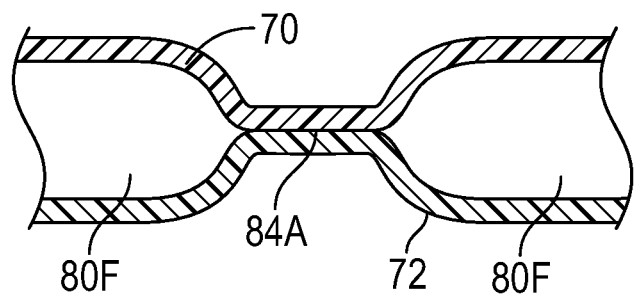
FIG. 4 is a schematic cross-sectional illustration of the bladder element of FIG. 2 taken at lines 4-4 in FIG. 2.

For example, the bladder element 30 may be inflated through the inflation port 82 initially to a first inflation pressure. Next the channel 80F between the cushioning component 34H and the cushioning component 34G can be sealed (i.e., closed) closed such as by thermal bonding of the walls of the channel 80F together to create a weld 84A. Sealing of the channel 80F is indicated at weld 84A in FIG. 4. Closing the channel 80F establishes a final first inflation pressure of the cushioning component 34H in the heel portion 22. Inflation fluid in the remainder of the bladder element 30 (i.e., all of the bladder element 30 between the inflation port 52 and the closed channel 80F, referred to as the first remaining unsealed portion) can be released through the inflation port 52, or can remain in the bladder element 30 as inflation continues. The first remaining unsealed portion of the bladder element 30 is then further inflated through the inflation port 52 to a final second inflation pressure. All portions of the bladder element 30 up to the weld 84A will thus be at the second inflation pressure.

Optionally, one or both of channels 80C and 80D can then be sealed such as by thermal bonding of the walls of the respective channel 80C or 80D together to create a weld 84B or 84C. Closing the channel 80D, such as by thermal bonding, establishes the final second inflation pressure of the cushioning components 34F, 34G and tubular cushioning components 36A, 36B. Closing the channel 80C established the second final inflation pressure of the cushioning component 34E. Inflation fluid in the remainder of the bladder element 30 between the welds 84B, 84C and the inflation port 82 (referred to as the second remaining unsealed portion) can be released through the inflation port 82 or can remain in the bladder element 30 as inflation continues. The second remaining unsealed portion of the bladder element 30 can then be further inflated through the inflation port 82 to a final third inflation pressure. The inflation port 82 can then be closed, such as by thermal bonding of the walls of the inflation port 82 to one another. This establishes the third inflation pressure as the final inflation pressure of the cushioning components 34A, 34B, 34C, and 34D. Alternatively, additional sequential inflation can occur with any or all of the remaining channels 80A, 80B, 80C, 80E and 80G sealed, to establish different inflation pressures in the remaining cushioning components 34A, 34B, 34C, and 34D. In the embodiment of FIG. 2, channel 80D may be referred to as a first channel and channel 80F may be referred to as a second channel.

In yet another alternative, none of the channels 80A, 80B, 80C, 80D, 80E, 80F and 80G are closed depending on the desired final inflation pressures and desired ability for fluid communication within the bladder element 30, or one or more of the channels 80A, 80B, 80C, 80D, 80E, 80F and 80G can be closed but the inflation pressures in the different portions separated by a closed channel can be the same, so that the effect of the closed channel is only to prevent fluid communication between the portions separated by the closed channel.

In an arrangement of the bladder element 30 with the cushioning components 34A, 34B, 34C, 34D, 34E, 34F, and 34G as described, various gaps are provided between adjacent ones of the cushioning components 34A, 34B, 34C, 34D, 34E, 34F, and 34G. For example, the cushioning components 34A and 34C are substantially decoupled from one another, and the cushioning components 34B and 34D are substantially decoupled from one another, so that a gap G1 extends from the lateral extremity 60 to the medial extremity 62 between the substantially decoupled cushioning components 34A and 34C, and between the decoupled cushioning components 34B and 34D. The gap G1 is traversed only by the channels 80A, 80B. The channels 80A and 80B are relatively narrow in width in comparison to the cushioning components 34A, 34B, 34C, 34D, and extend generally longitudinally between the cushioning components 34A, 34B, 34C, and 34D. Accordingly, the channels 80A, 80B do not significantly diminish flexibility of the sole structure 16 in a fore-aft (i.e., longitudinal) direction at the gap G1.

Similarly, an additional gap G2 is provided extending from the lateral extremity 60 to the medial extremity 62 between the substantially decoupled adjacent cushioning components 34C and 34D, and between the decoupled adjacent cushioning components 34D and 34F. The gap G2 is traversed only by the channels 80C and 80D. The channels 80C and 80D are relatively narrow in width in comparison to the cushioning components 34C, 34D, 34E, and 34F, and extend generally longitudinally between the cushioning components 34C, 34D, 34E, and 34F. Accordingly, the channels 80C and 80D do not significantly diminish flexibility of the sole structure 16 in the longitudinal direction at the gap G2.

Another gap G3 extends generally in a longitudinal direction between the substantially decoupled cushioning components 34G and 34H, interrupted only by the channel 80F. The gap G3 allows increased flexibility of the bladder element 30 in the longitudinal direction between the cushioning components 34G and 34H. The channel 80F is relatively narrow in width in comparison to the cushioning components 34G and 34H, and therefore does not significantly diminish flexibility of the sole structure 16 in the longitudinal direction at the gap G3.

A gap G4 extends in a generally longitudinal direction between substantially cushioning components 34A, 34C, and 34D on a medial side of the gap G4, and cushioning components 34B, 34D, and 34F on a lateral side of the gap G4. The gap G4 is interrupted only by the channels 80G and 80E. The gap G4 allows increased flexibility of the bladder element 30 in a lateral direction between the cushioning components 34A, 34C, and 34D on the medial side of the gap G4, and the cushioning components 34B, 34D, and 34F on the lateral side of the gap G4. The channels 80A and 80B are relatively narrow in width in comparison to the cushioning components 34A, 34B, 34C, 34D, 34E, and 34F, and therefore do not significantly diminish flexibility of the sole structure 16 in the lateral direction.

Accordingly, the gaps G1, G2 and G3 serve as flexion regions for flexing of the sole structure 16 substantially in the fore-aft (i.e., longitudinal) direction, and gap G4 serves as a flexion region for flexing of the sole structure substantially in a lateral direction. Any foam of the sole layer 32 that covers the outer surfaces of the cushioning components 34A, 34B, 34C, 34D, 34E, 34F, 34G, 34H, 36A, and 36B and fills the gaps G1, G2, G3 can be configured to have greater flexibility than the inflated bladder element 30.

Figure 10:
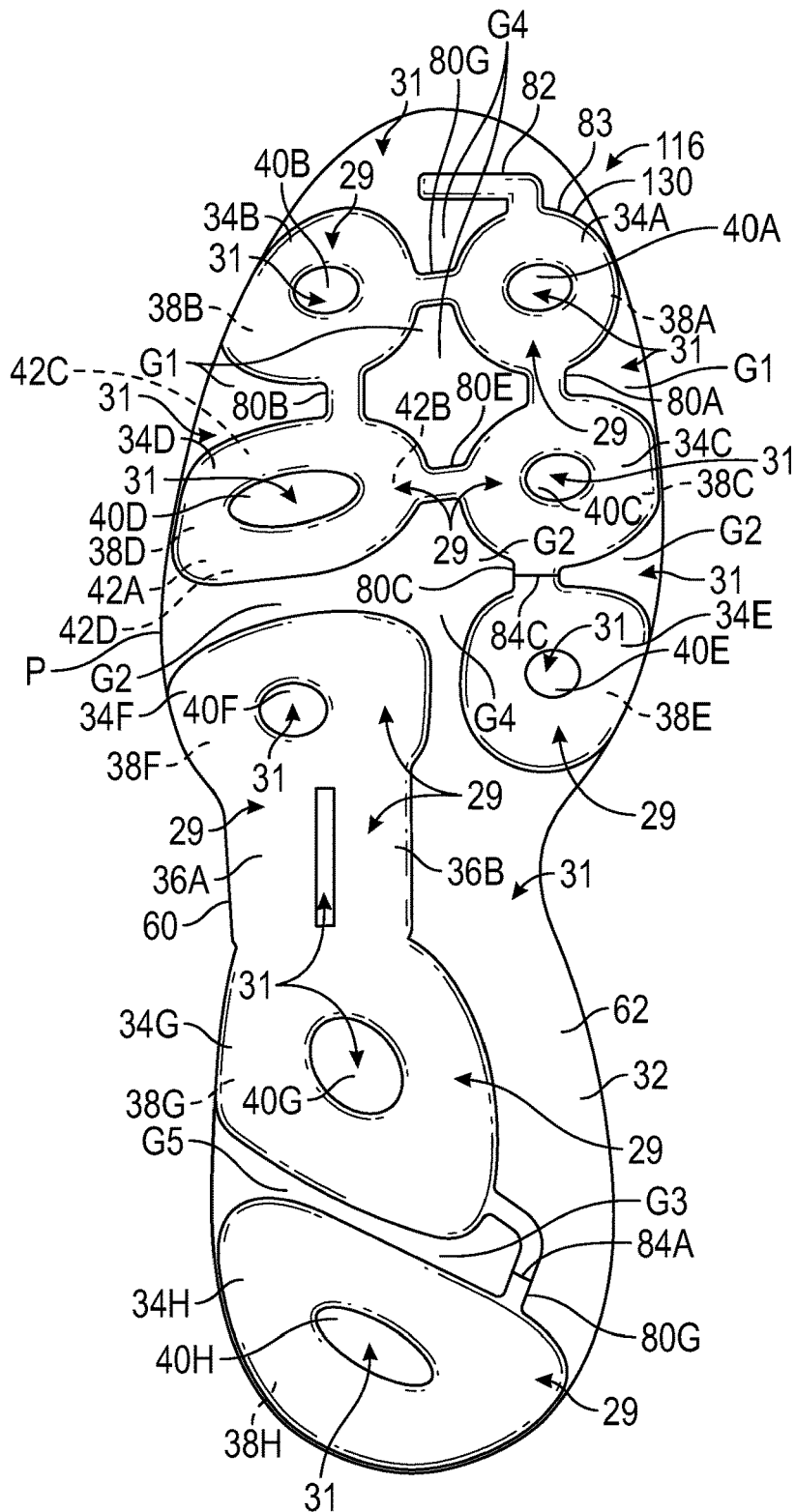
FIG. 10 is a schematic illustration in bottom view of an alternative configuration of a sole structure for the article of footwear of FIG. 1.
Figure 11:
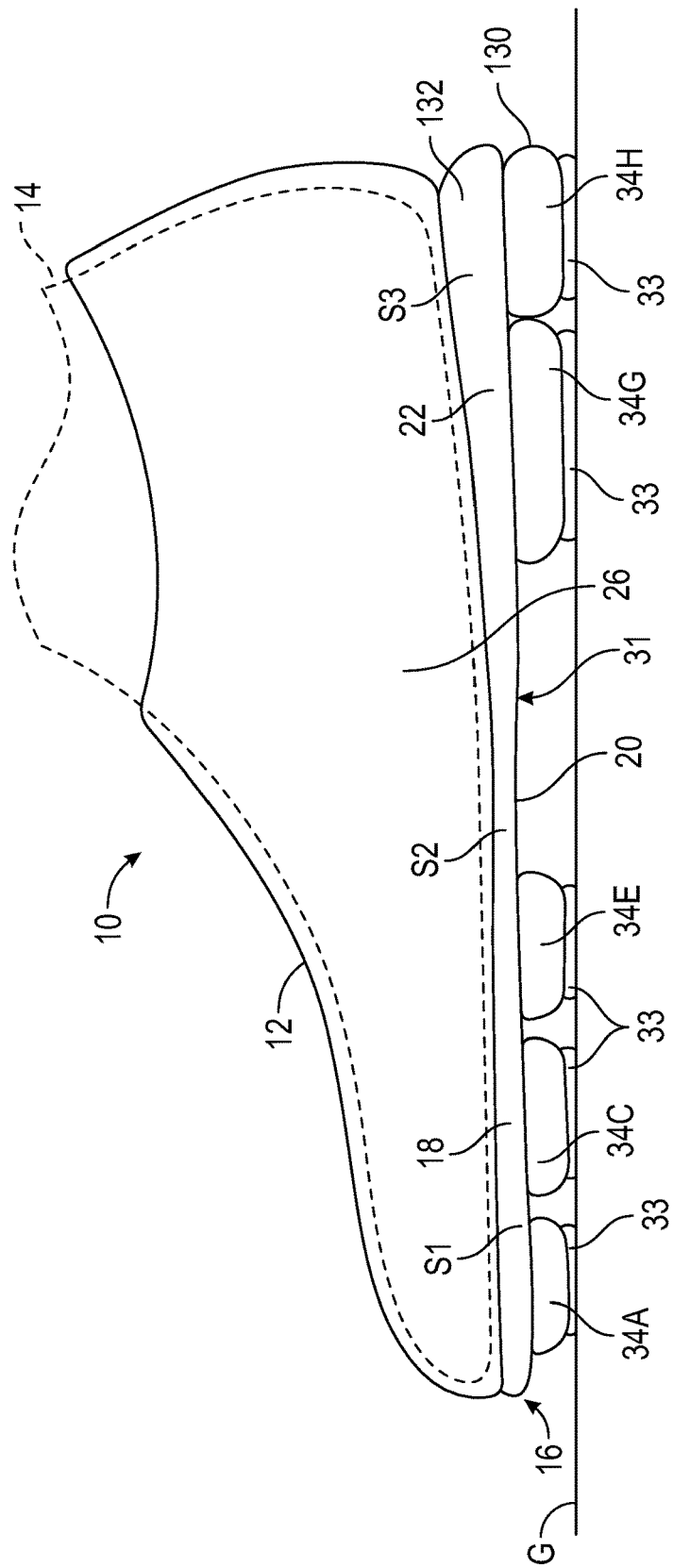
FIG. 11 is a schematic illustration in side view of the sole structure of FIG. 10.

FIGS. 10 and 11 show another embodiment of sole structure 116 including a bladder element 130 that can be used in place of the sole structure 16 and bladder element 30 of FIG. 2. The sole structure 16 and the bladder element 130 have many of the same features as described with respect to the sole structure 16 and the bladder element 30, and such features are referenced with the same reference numbers as shown and described with respect to FIG. 2. The bladder element 130 is identical to bladder element 30 except that channel 80F is replaced with channel 80G. Positioning the channel 80G on a medial side of the cushioning component 34G allows a gap G5 between the cushioning components 34G and 34H to be narrower than the gap G3.

The sole structure 116 is also different than the sole structure 16 because a sole layer 132 is used in place of sole layer 32. The sole layer 132 has a differential stiffness in the longitudinal direction. For example, the sole structure 132 may be stiffer in the midfoot portion 20 than in the heel portion 22 or the forefoot portion 18, and the heel portion 22 may be stiffer than the forefoot portion 18. The differential stiffness of the sole layer 132 may be accomplished in a number of ways. For example, the sole layer 132 could be thicker in the z direction (i.e., a direction normal to the level ground G) in portions configured with greater stiffness, such as by making the midfoot portion 20 thicker than the heel 22 and thicker than the forefoot portion 18. In one embodiment, the sole layer 132 could include multiple stacked layers extending generally in the longitudinal direction. More layers may be included in areas configured with greater stiffness. Additionally or in the alternative, the sole layer 132 could include different materials, with stiffer materials in portions configured with greater stiffness. For example, the sole layer 132 could be foam, with foam of a first stiffness S1 in the forefoot portion 18, foam of a second stiffness S2 in the midfoot portion 20, and foam of a third stiffness S3 in the heel portion 22.

Figure 12:
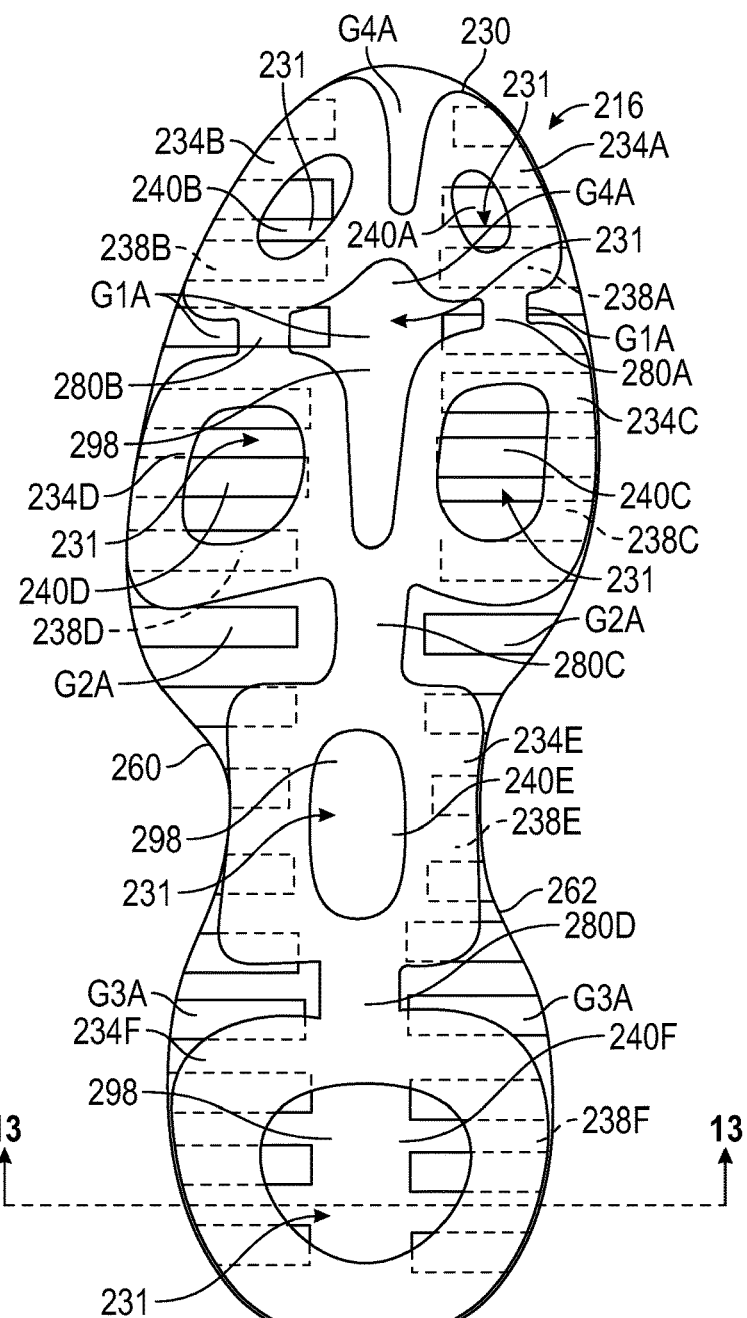
FIG. 12 is a schematic illustration in bottom view of an alternative configuration of a sole structure for the article of footwear of FIG. 1.
Figure 13:
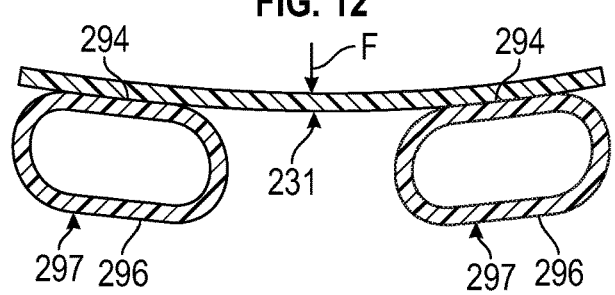
FIG. 13 is a schematic cross-sectional illustration of the sole structure of FIG. 12 taken at lines 13-13 in FIG. 12.

FIGS. 12 and 13 show another embodiment of a sole structure 216 including a bladder element 230 that can be used in place of the sole structure 16 and bladder element 30 of FIG. 2. The bladder element 230 is similar to bladder element 30, as it includes multiple cushioning components 234A, 234B, 234C, 234D, 234E and 234F, each having a single central opening 240A, 240B, 240C, 240D, 240E, 240F, and 240G, respectively, extending completely therethrough. Each cushioning component 234A, 234B, 234C, 234D, 234E and 234F has a continuous fluid-filled cavity 238A, 238B, 238C, 238D, 238E and 238F, respectively, surrounding the single central opening. The cushioning components 234A, 234B, 234C, 234D, 234E and 234F are spaced apart from one another so that an outer surface of each of the cushioning components 234A, 234B, 234C, 234D, 234E and 234F is spaced apart form an outer surface of an adjacent one of the cushioning components 234A, 234B, 234C, 234D, 234E and 234F, as is apparent in FIG. 10. Cushioning component 234A may be referred to as a first cushioning component, cushioning component 234B may be referred to as a second cushioning component, cushioning component 234C may be referred to as a third cushioning component, and cushioning component 234D may be referred to as a fourth cushioning component. Alternatively, cushioning component 234E may be referred to as a first cushioning component and cushioning component 234F may be referred to as a second cushioning component.

Both cushioning components 234E and 234F extend across the longitudinal midline L. Moreover, each of the cushioning components 234E and 234F extend from the lateral extremity 260 to the medial extremity 262 of the sole structure 216.

Channels 280A, 280B, 280C, and 280D connect adjacent ones of the cushioning components 234A, 234B, 234C, 234D, 234E, and 234F, establishing fluid communication between the adjacent cushioning components and allowing simultaneous inflation of the cushioning components through an inflation port (not shown), with different inflation pressures possible if one or more of the channels are sealed, as discussed with respect to the bladder element 30. Gaps G1A, G2A, G3A, and G4A are provided between the cushioning components, similar to gaps G1, G2, G3, and G4 of FIG. 2, respectively, due to an absence of bladder material (i.e., no webbing) between the cushioning components.

As shown in FIGS. 12 and 13, the sole layer 232 has a ground-facing surface 231, and the bladder element 230 has a first side 294 attached to the ground-facing surface 231 of the sole layer 216. The cushioning components also have a second side 296 opposite to the first side 294, with the second side 296 also having a ground-facing surface 297. The ground-facing surface 231 of the sole layer 232 is exposed both between the cushioning components 234A, 234B, 234C, 234D, 234E, and 234F and within the central opening 240A, 240B, 240C, 240D, 240E, and 240F of each of the cushioning components. Additionally, the sole layer 230 has slats 290 that extend generally transversely over the first side 294 of the bladder element 230. The slats 290 are linked by a connector, which could be located inset from a medial and lateral perimeter of the slats or along the perimeter of the slats. In the embodiment shown, the connector is a central spine 298 inset from the perimeter. The slats 290 extend laterally from the central spine 298, with some of the slats 290 extending to the lateral extremity 260, and some of the slats 290 extending to the medial extremity 262. Portions of the slats 290 located above the cushioning components 234A, 234B, 234C, 234D, 234E, and 234F in the bottom view of FIG. 12 are indicated with hidden lines. Each adjacent slat 290 is separated from an adjacent slat 290 by a gap. A downward force F on the slats 290 causes deflection, and allows the slats 290 to deflect inward into the central opening of each cushioning component, as shown with respect to central opening 240F in FIG. 13. FIG. 13 is taken at lines 13-13 in FIG. 12 and rotated 180 degrees with respect to the bottom view of FIG. 12. The slats 290 may function as described with respect to the beams in U.S. Pat. No. 7,013,581 to Greene et al., which is hereby incorporated by reference in its entirety.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method of manufacturing a sole structure of an article of footwear comprising:
forming a bladder element having multiple fluid-filled cushioning components, each cushioning component having a single central opening extending completely therethrough and each cushioning component having a continuous fluid-filled cavity surrounding the central opening; wherein the cushioning components are spaced apart from one another so that an outer surface of each cushioning component is substantially decoupled from an outer surface of an adjacent one of the cushioning components.

2. The method of claim 1, further comprising:
disposing the bladder element so that a gap extends transversely across the bladder element between adjacent ones of the cushioning components with only channels of the bladder element that connect adjacent ones of the cushioning components traversing the gap.

3. The method of claim 1, wherein said forming is one of blow molding and thermoforming.

4. The method of claim 1, wherein said forming further comprises:
forming channels connecting adjacent ones of the cushioning components to establish fluid communication between the adjacent ones of the cushioning components; and
forming an inflation port disposed at a periphery of the bladder element and in fluid communication with the adjacent ones of the cushioning components via the channels.

5. The method of claim 4, further comprising:
inflating the bladder element through the inflation port to a first inflation pressure;
closing one of the channels to form a sealed first portion of the bladder element;
inflating a first remaining unsealed portion of the bladder element through the inflation port to a second inflation pressure;
closing another of the channels to form a sealed second portion of the bladder element; and
inflating a second remaining unsealed portion of the bladder element through the inflation port to a third inflation pressure, thereby establishing different inflation pressures in different ones of the cushioning components separated from one another by the closed channels.

6. The method of claim 1, wherein:
the cushioning components include a first cushioning component and a second cushioning component adjacent to the first cushioning component with both the first cushioning component and the second cushioning component positioned in a forefoot portion of the bladder element;
the first cushioning component is positioned between a medial side of the bladder element and the second cushioning component; and
the second cushioning component is positioned between a lateral side of the bladder element and the first cushioning component.

7. The method of claim 6, wherein:
the cushioning components further include a third cushioning component and a fourth cushioning component;
the third cushioning component is positioned between the medial side of the bladder element and the fourth cushioning component;
the fourth cushioning component is positioned between the lateral side of the bladder element and the third cushioning component; and
the third and fourth cushioning components are rearward of the first and second cushioning components.

8. The method of claim 6, wherein the cushioning components include:
a first heel cushioning component that extends across a longitudinal midline of the sole structure in a heel portion of the bladder element; and
a second heel cushioning component that extends across the longitudinal midline of the sole structure and is spaced rearward of the first heel cushioning component in the heel portion of the bladder element; and the method further comprising:
sealing a channel that fluidly connects the first heel cushioning component to the second heel cushioning component so that the first heel cushioning component and the second heel cushioning component are not in fluid communication with one another.

9. The method of claim 1, wherein:
the bladder element includes channels connecting adjacent ones of the cushioning components and establishing fluid communication between said adjacent ones of the cushioning components;
a first of the channels is in a forefoot portion of the bladder element, and a second of the channels is in a heel portion of the bladder element; and
the method further comprising sealing the first and the second of the channels so that the adjacent ones of the cushioning components connected by the first of the channels are not in fluid communication with one another and the adjacent ones of the cushioning components connected by the second of the channels are not in fluid communication with one another.

10. The method of claim 9, wherein:
at least one of the cushioning components is in a midfoot portion of the bladder element and at least one of the cushioning components is in the forefoot portion;
a rearmost one of the cushioning components is in the heel portion; and
said at least one of the cushioning components in the midfoot portion is not in fluid communication with said at least one of the cushioning components in the forefoot portion and is not in fluid communication with the rearmost one of the cushioning components.

11. The method of claim 1, wherein the bladder element further includes:
a pair of tubular cushioning components extending lengthwise in a longitudinal direction in a midfoot portion of the bladder element; wherein both of the tubular cushioning components are connected to one of the cushioning components forward of the pair of tubular cushioning components and to another one of the cushioning components rearward of the pair of tubular cushioning components.

12. The method of claim 1, wherein:
the bladder element includes a respective channel connecting and establishing fluid communication between each adjacent pair of the cushioning components such that the cushioning components of the adjacent pair are spaced apart from one another by the respective channel;

each of the cushioning components is a regular ring torus having a circular outer periphery; and the circular outer periphery of each of the cushioning components is spaced apart from and not in contact with the circular outer periphery of each adjacent one of the cushioning components.

13. A method of manufacturing a sole structure of an article of footwear comprising:

securing a ground-facing surface of a sole layer to at least a portion of an outer surface of a bladder element;

wherein the bladder element has multiple fluid-filled cushioning components, each cushioning component having a single central opening extending completely therethrough and having a continuous fluid-filled cavity surrounding the central opening; wherein the cushioning components are spaced apart from one another so that an outer surface of each cushioning component is substantially decoupled from an outer surface of an adjacent one of the cushioning components and the ground-facing surface of the sole layer is exposed both between the cushioning components and within the central opening of each of the cushioning components.

14. The method of claim 13, wherein the sole layer has slats that extend generally transversely over the single central opening of each of the cushioning components.

15. The method of claim 13, wherein the bladder element has an upper sheet and a lower sheet that together form the cushioning components; and wherein said securing includes attaching the upper sheet to the ground-facing surface of the sole layer.

16. The method of claim 13, wherein the bladder element has an upper sheet and a lower sheet that together form the cushioning components; and the method further comprising:

securing discreet outsole elements to the lower sheet such that the discreet outsole elements establish a ground contact surface of the sole structure and the ground-facing surface is exposed between the discreet outsole elements.

17. The method of claim 13, wherein:

the sole layer is a foam midsole layer; and said securing the ground-facing surface of a sole layer to at least a portion of the outer surface of a bladder element includes covering upper portions of the outer surface of the bladder element with the sole layer.

18. The method of claim 13, wherein one or more of the cushioning components is a regular ring torus or an irregular ring torus.

19. A method of manufacturing a sole structure of an article of footwear comprising:

forming a bladder element having multiple fluid-filled cushioning components, each cushioning component having a single central opening extending completely therethrough and each cushioning component having a continuous fluid-filled cavity surrounding the central opening; wherein the cushioning components are spaced apart from one another so that an outer surface of each cushioning component is substantially decoupled from an outer surface of an adjacent one of the cushioning components;

wherein said forming further comprises:

forming channels connecting adjacent ones of the cushioning components to establish fluid communication between the adjacent ones of the cushioning components; and forming an inflation port disposed at a periphery of the bladder element and in fluid communication with the adjacent ones of the cushioning components via the channels;

inflating the bladder element through the inflation port to a first inflation pressure;

closing one of the channels to form a sealed first portion of the bladder element;

inflating a first remaining unsealed portion of the bladder element through the inflation port to a second inflation pressure;

closing another of the channels to form a sealed second portion of the bladder element; and inflating a second remaining unsealed portion of the bladder element through the inflation port to a third inflation pressure, thereby establishing different inflation pressures in different ones of the cushioning components separated from one another by the closed channels.

20. The method of claim 19, further comprising:

securing a ground-facing surface of a sole layer to at least a portion of an outer surface of a bladder element; wherein the ground-facing surface of the sole layer is exposed both between the cushioning components and within the central opening of each of the cushioning components.

* * * * *